United States Patent [19]

Robertson

[11] 4,345,859
[45] Aug. 24, 1982

[54] HOPPER DISCHARGE VALVE

[75] Inventor: Harry G. Robertson, Chicago, Ill.

[73] Assignee: Edsco, Inc., Evergreen Park, Ill.

[21] Appl. No.: 155,615

[22] Filed: Jun. 2, 1980

[51] Int. Cl.³ .............................................. B65G 53/46
[52] U.S. Cl. ..................................... 406/128; 222/554; 406/145
[58] Field of Search ............... 406/128, 129, 131, 145; 222/548, 554, 555, 545; 105/283

[56]  References Cited

U.S. PATENT DOCUMENTS 3,482,741  12/1969  Fritz ................................. 222/554 X
3,554,609  1/1971   Rollins .............................. 406/129
3,583,768  6/1971   Koranda ........................... 406/145 X
3,797,891  3/1974   Fritz ................................. 406/131 X
4,082,365  4/1978   Dugge et al. ..................... 406/129

Primary Examiner—Jeffrey V. Nase
Attorney, Agent, or Firm—Edward C. Threedy

[57] ABSTRACT

A hopper discharge valve for railway hopper cars used in transporting granular lading with the valve including a fully rotatable valve shaft having a plurality of discharging channels formed in its periphery throughout its length, with the channels being arranged so as to provide simultaneous discharge from both ends of the hopper car or from selected ends thereof.

8 Claims, 11 Drawing Figures

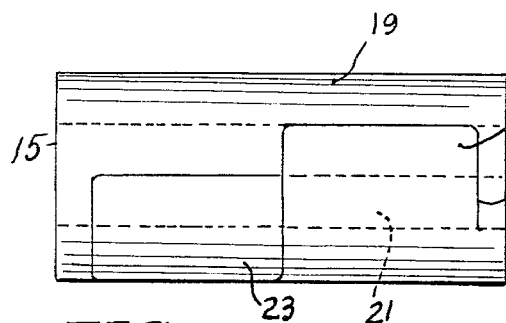
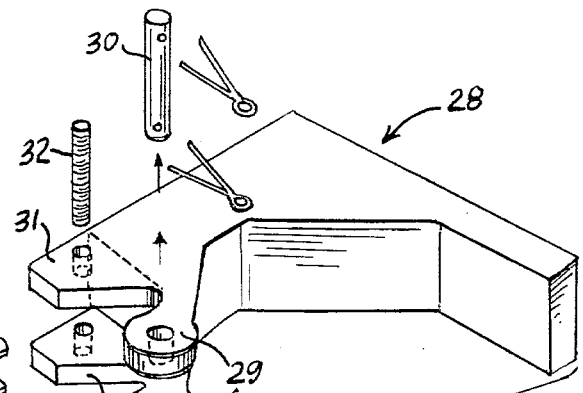
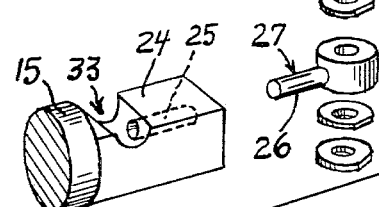
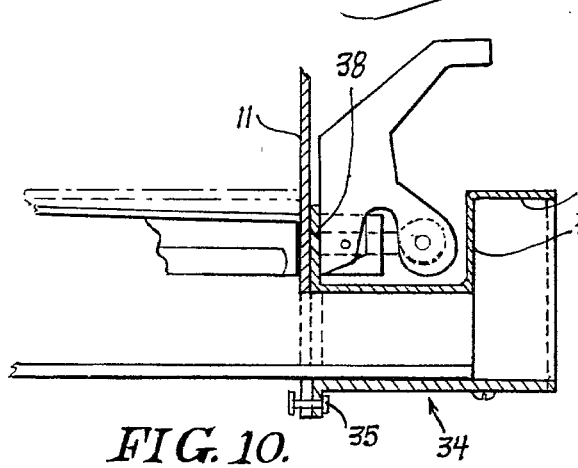
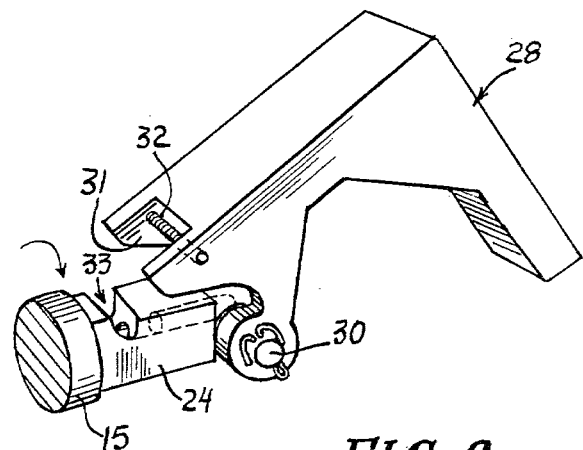
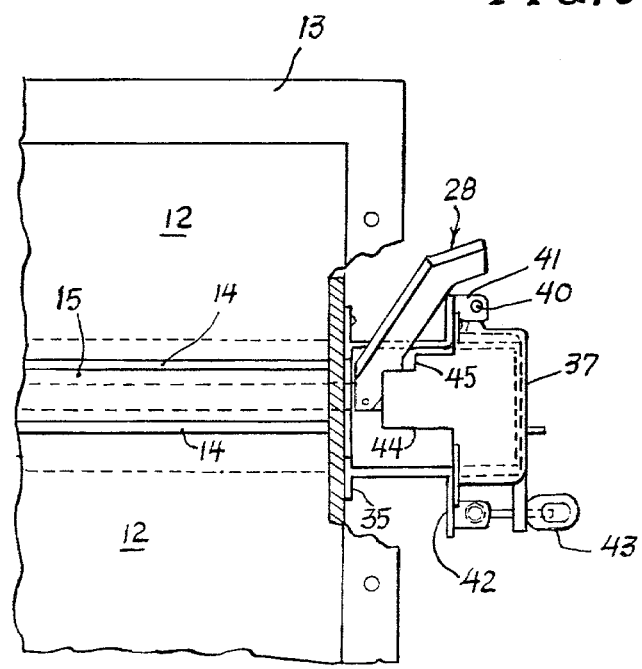

4,345,859

HOPPER DISCHARGE VALVE

SUMMARY OF THE INVENTION

An object of this invention is to provide a hopper discharge valve comprising a rotatable shaft which during its rotational operation will prevent the granular lading or pellets from becoming impinged between wall portions of the valve shaft and the inclined side walls of the hopper, and thus restrict discharge flow.

To achieve this stated object I have angularly displaced the axis of the rotatable valve shaft, positioned in the hopper discharge opening, relative to the confronting edges of the inclined side walls of the hopper, forming an obtuse angle between a tangent extending from the shaft's periphery and the surface of the inclined side wall of the hopper. This resulting larger angle between the movable shaft and the stationery wall will prevent binding or trapping of the granular lading lodged therebetween regardless of size or shape.

Another object of the invention is to provide a valve shaft having a larger diameter, that will permit formation of an enlarged discharge channel therein, capable of accommodating large pellets and the like, while eliminating any impediments to the continuous discharge flow.

Yet another object of the invention is to provide a discharge valve that will produce a selected end discharge of the hopper car, as well as a full (both ends simultaneously opened) discharge, with the rate of discharge sufficient to insure a complete clean-out of the hopper. The valve and its various operating positions is adaptable for use with pressurized or vacuum unloading systems.

A further object of the invention is to provide an enlarged semicircular discharge tube positioned in an angularly offset relation to the longitudinal axis of the rotatable valve shaft allowing for the forming of an enlarged discharge opening resulting in a greater volume of discharge flow therethrough.

DESCRIPTION OF THE DRAWINGS

The invention will be best understood by reference to the accompanying drawings which illustrate the preferred form of embodiment of the invention by which the stated objects thereof are achieved.

FIG. 7 is a perspective view of the operating handle with the parts thereof in exploded relation.

FIG. 8 is a perspective view of the handle in its disengaged position.

FIG. 9 is an illustration of the plane surface configuration of the valve shaft.

FIG. 10 is a fragmentary side sectional view of one end of the discharge tube and operating handle.

FIG. 11 is a top fragmentary view of the discharge tube with cap is lock position.

GENERAL DESCRIPTION

Figure 1:
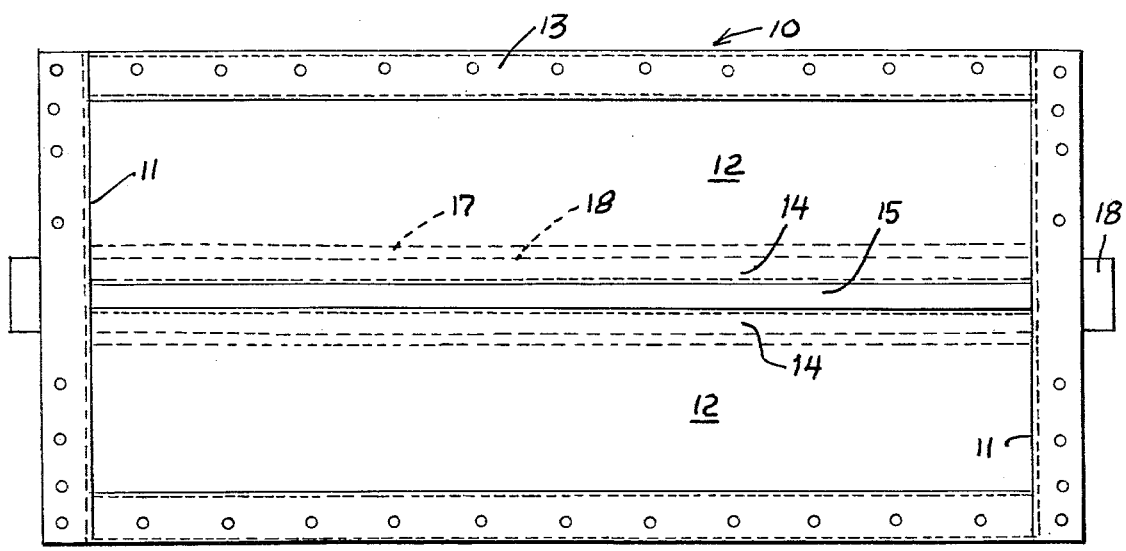
FIG. 1 is a top plan view of the hopper discharge structure of the invention.
Figure 2:
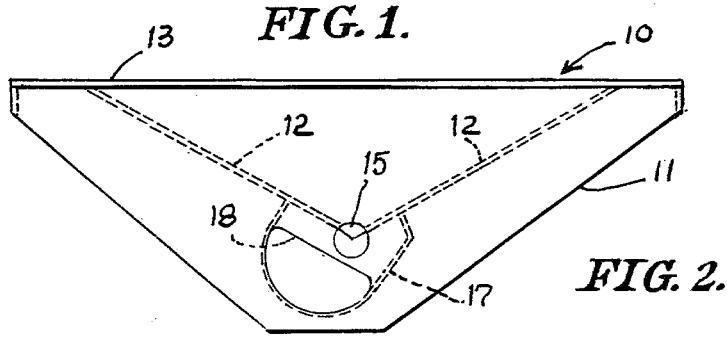
FIG. 2 is a side elevational view of the hopper structure showing certain parts thereof in dotted lines.

Referring to the drawings, there is indicated by reference character 10, a hopper discharge structure adapted for mounting on the underside of a hopper-type railway car or the like.

The hopper discharge structure 10 of this invention as shown in FIGS. 1 and 11, comprises vertical end walls 11 and inclined side walls 12, all joined by a rectangular frame 13.

The inclined side walls 12 are of such a length that their lower edges 14 do not mate but terminate in a spaced-apart relation providing an opening therebetween, of a size to receive therein, a segment of an elongated rotatable valve shaft 15, as seen in FIGS. 2 through 6.

In FIGS. 10 and 11, the valve shaft 15 is shown to have its reduced ends journalled in the end walls 11, so as to be rotated about its longitudinal axis which is located at a point beneath a line extending between the confronting edges 14 of the side walls 12. A tangential line drawn from the periphery of the shaft at a point adjacent to the approach of the edge 14 of the side wall, and a line extending along the surface of the side wall will produce an obtuse angle of incidence therebetween, the resulting object of which will hereinafter be made apparent.

The valve shaft 15 extends through an elongated discharge trough 17. As illustrated in FIGS. 2 through 6, the trough 17 is offset with respect to the longitudinal axis of the shaft 15, and opens on each end into restricted discharge tubes 18. As shown, the discharge tubes 18 are offset with respect to the valve shaft 15 and discharge opening found between the confronting edges of the side walls 12.

It should be noted that the walls of the trough 17 are adequately spaced from the valve shaft 15 so as not to interfere with a discharge flow that will pass from the hopper 10 through the valve and into the trough 17.

To accomplish all of the stated objects of this invention the valve shaft 15 must be of a specific and particular construction. The valve shaft 15 is divided in cross section into quadrants. To understand the configuration of the valve shaft 15, reference is made to FIG. 9 which illustrates in plane the surface configuration of the valve. The first quadrant as shown at 19 in FIG. 3 is of a solid construction and runs the entire length of the shaft 15.

Figure 4:
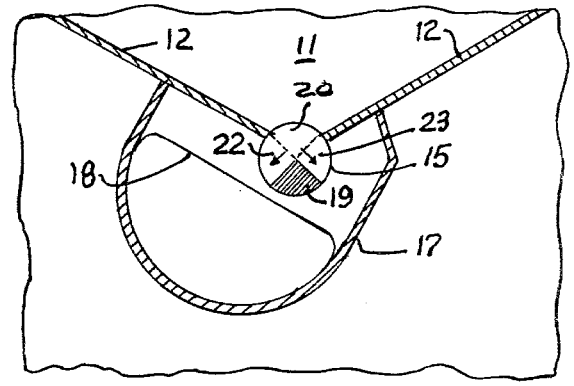

The second quadrant is shown as at 20 in FIG. 4 and is completely removed to form a discharge channel 21 that extends the full length of the shaft 15, and is opposed 180° to quadrant 19.

Figure 5:
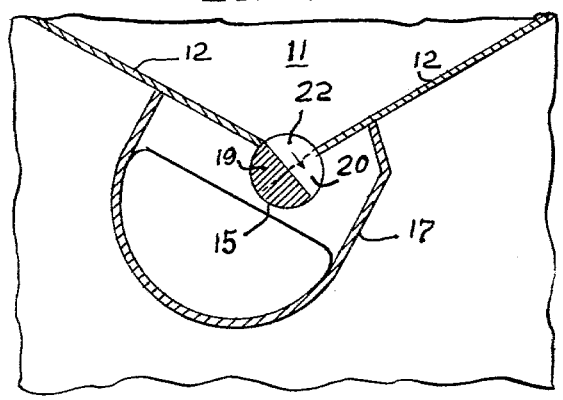
Figure 6:
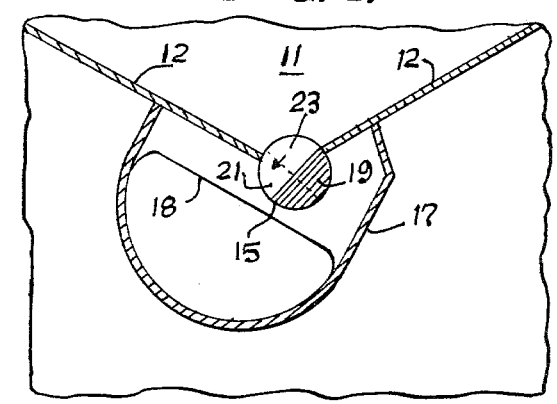

Quadrants three and four include partial channels 22 and 23 as shown in FIGS. 5 and 6 formed to opposite sides of the channel 21 of the second quadrant and extend in opposite directions from a mid-point on the elongated shaft 15

Figure 3:
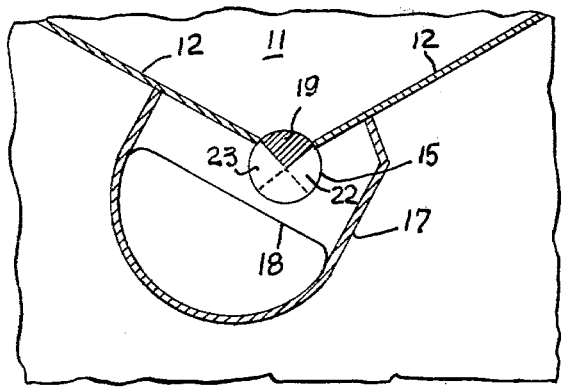
FIGS. 3 through 6 are fragmentary sectional detailed views showing the valve shaft in different operative positions.

By this construction when the valve shaft 15 is rotated into the position as shown in FIG. 3, the first quadrant 19 will extend between the edges 14 of the inclined walls 12 of the hopper structure 10 and prevent any discharge therefrom.

When the valve shaft 15 is rotated a full 180° from the position shown in FIG. 3 to that as shown in FIG. 4, the channel 21 of the second quadrant will extend between the confronting edges 14 of the inclined side walls 12. In this position the valve shaft 15 will permit discharge through the channel 21 as well as the channels 22 and 23. This position consitutes a full open discharge condition of the valve.

As the valve shaft 15 is rotated 90° in a clock-wise direction from that shown in FIG. 4 to its position as shown in FIG. 5, the channel 22 of the third quadrant, having open communication with channel 21, will permit a discharge flow therethrough from one-half of the hopper which is equivalent to one-half of the length of the valve shaft 15. A rotation of the valve shaft 15 in a counter-clock-wise direction from that shown in FIG. 4 to the condition shown in FIG. 6, will permit channel 23 of the fourth quadrant to have communication with the full channel 21 and permit discharge from the other side of the hopper again equal to one-half the length of the valve shaft 15.

The opposite ends of the valve shaft 15 after passing through suitable bushings provided by the end walls 11 are squared as at 24. A circular socket 25 is formed in the exposed squared end 24 and is adapted to freely receive the shank 26 of an eye pin 27.

A handle 28 is provided and it includes spaced circular bearings 29 through which a removable pivot pin 30 is journalled with the pivot pin 30 passing through the eye of the pin 27 as shown in FIG. 8.

Adjacent the spaced circular bearing 29, the handle 28 is bifurcated to provide a pair of legs 31. Extending between the legs 31 is a latch pin 32. As the handle is pivoted about the pivot pin 30, the legs 31 will pass beyond opposite flat sides of the squared end 24 of the shaft 15 until the latch pin 32 sits in a groove 33 cut in one flat surface of the squared end of the shaft 15 maintaining the handle 28 in the position shown in FIG. 10.

In the position of the handle shown in FIG. 10 the valve shaft 15 is in its fully closed condition as shown in FIG. 3. If the handle 28 is rotated through 90° in a counter-clock-wise direction the valve shaft 15 will rotate into the partially opened position as shown in FIG. 5, with channels 21 and 22 being exposed to the hopper.

If from the position of the handle as shown in FIG. 10, it and the valve shaft 15 are rotated in a clock-wise direction, the valve shaft will be partially opened as shown in FIG. 6, with only channel 23 exposed to the hopper.

From the foregoing it is readily apparent that the valve shaft 15 may be rotated either clock-wise or counter-clock-wise to open the valve to opposite ends of the hopper. This has been accomplished by rotating the handle 28 through 90° in either direction. To open the valve shaft 15, simultaneously to both ends of the hopper such that it assumes the position shown in FIG. 4, the handle 28 and the valve shaft 15 must be first pivoted into the position shown in FIG. 5 which has resulted from a 90° rotation of the valve shaft 15. The handle 28 is then disengaged from the valve shaft 15 by pivoting the same on the pivoting pin 30 into the position shown in FIG. 8.

In such a pivoted position the legs 31 and latch pin 32 will be dislodged from the groove 33 and the squared end 24 of shaft 15. The handle 28 alone may be then pivoted back in the direction of the arrow in FIG. 8, 90° to its starting position, until the legs 31 are aligned with opposite sides of the squared end 24 of the valve shaft 15. The handle 28 is then pivoted back on pin 30 with the legs 31 engaging the shaft 15. When this has been accomplished, the handle and the valve shaft may be rotated an additional 90° until the valve shaft 15 assumes the position shown in FIG. 4. To return the valve shaft 15 to its original closed position, the above-described procedure is reversed.

Referring to FIG. 10, it is shown that the discharge trough 18 which projects beyond the side walls 11 of the hopper 10 has positioned thereon, a sleeve 34, which by suitable fasteners 35 is removably connected on the trough 18 as well as the side walls 11.

This sleeve provides an enlarged circular discharge port 36 to which is mounted a cap 37 (see FIG. 11).

It should be noted that the handle 28 is retained in a connected condition with respect to the squared end 24 of the valve shaft 15 by being retained against axial movement with respect to the valve shaft 15 by a connecting flange 38 provided by the sleeve 34 and a rear wall 39 of the enlarged discharge port 36.

Referring to FIG. 11, it is seen that the cap 37 is hinged at 40 to an arm 41 which extends laterally from the front wall 42 provided by the discharge port 36. A retaining bolt 43 serves to hold the cap 37 in a closed position upon the discharge port 36.

The cap 37 provides a rearwardly extending wall 44 which is adapted to project along the side of the handle 28 when the same is in its normal position as shown in FIG. 10. This wall 44 provides a shoulder 45 which is adapted to engage behind the handle 28. Thus, the wall 44 and the shoulder 45 as provided by the cap 37 prevents rotation of the handle 28 when the cap 37 is in its locked position. It should also be noted that the cap 37 cannot be placed onto the discharge port 36 unless the handle 28 is in its normal position as shown in FIG. 10.

The opposite end of the valve shaft 15 is provided with a like handle and cap with the handle having a normal position diagrammatically opposed to that of the handle 28 as shown in FIG. 11. Thus, each of the caps cooperate by engaging opposite sides of their respective handles to prevent rotational movement of the handles when the caps are in their locked position.

From the foregoing, it is apparent that the improvement in the valve shaft 15 permits the formation of a larger discharge opening between the inclined side walls of the hopper as well as an increased diameter for the valve shaft. By providing the valve shaft with a solid quadrant which extends throughout its longitudinal length, I have effectively reduced twisting due to rotational torque along the length of the valve shaft 15 during its operation. By displacing the axis of the valve shaft relative to the discharge opening, I have effectively changed the angle of incidence between the periphery of the valve shaft and the inclined end walls so as to prevent the clogging of granules therebetween. I have also provided an arrangement of discharge channels on the valve shaft which permits three methods of discharging of the lading, i.e. from both ends of the hopper simultaneously; from one end of the hopper, or the opposite ends of the hopper. The beneficial result of a simultaneous discharge is obvious but, in addition, such simultaneous discharge permits a one-operation clean-out of the hopper.

While I have illustrated and described the preferred form of construction for carrying my invention into effect, this is capable of variations and modifications without departing from the spirit of the invention. I, therefore, do not wish to be limited to the precise details of construction as set forth but desire to avail myself of such variations and modifications as come within the scope of the appended claims.

Having thus described my invention, what I claim as new and desire to protect by Letters Patent is:

1. A hopper discharge structure having a discharging valve for evacuating granular-like lading from hopper cars and the like comprising:

(a) a hopper structure providing end walls and inclined side walls, the confronting lower edges of which are spaced apart to provide a discharge opening therebetween, (b) a cylindrical valve shaft rotatably supported between said end walls along a line parallel to said discharge opening formed between said inclined side walls, (c) said valve shaft having its axis of rotation located equally between and along a line beneath said confronting lower edges of said inclined side walls with said valve shaft having a diameter such that a portion of its periphery sits within and closes said discharge opening, (d) said valve shaft providing a plurality of channels formed in selective portions thereof, with one channel in one portion extending throughout the length of said valve shaft, and with partial channels formed in adjacent portions and of a length less than said one channel and on diametrically opposite sides thereof, (e) means for rotating said shaft within said discharge opening so as to position said channels into selective lading discharging positions, (f) a trough underlying said valve shaft and enclosing said discharge opening for receiving the lading flowing therethrough, and (g) a discharge port mounted on said trough externally of said side walls through which the lading is exhausted under pneumatic or vacuum means.

2. A hopper discharge structure as defined by claim 1 wherein said means for rotating said valve shaft comprises a handle joined to the end of said valve shaft externally of said hopper structure, and means joining said handle to the end of said shaft with said handle having pivotable and rotational movement independently of said valve shaft so as to have a shaft rotating connection and a non-rotating shaft connection with said valve shaft.

3. A hopper discharge structure as defined by claim 2 including a cap for said discharge port, with said cap having means for preventing rotational movement of said handle and said valve shaft when said cap is mounted on and closes said discharge port.

4. A hopper discharge structure as defined by claim 1 including a cap for said discharge port, with said cap having means preventing rotational movement of said means for rotating said valve shaft when said cap is mounted on and closes said discharge port.

5. A hopper discharge structure as defined by claim 1 wherein said trough is beneath and horizontally offset with respect to said discharge opening and the axis of rotation of said valve shaft so as to overly a portion of one side wall of said hopper structure so as to reduce the depth of said structure without restricting the flow of lading therethrough.

6. A hopper discharge structure as defined by claim 5 wherein said means for rotating said valve shaft comprises a handle joined to the end of said valve shaft externally of said hopper structure, and means joining said handle to the end of said shaft with said handle having pivotable and rotating movement independently of said valve shaft so as to have a shaft rotating connection and a non-rotating shaft connection with said valve shaft.

7. A hopper discharge structure as defined by claim 6 including a cap for said discharge port, with said cap having means for preventing rotational movement of said handle and said valve shaft when said cap is mounted on and closes said discharge port.

8. A hopper discharge structure as defined by claim 5 including a cap for said discharge port, with said cap having means preventing rotational movement of said means for rotating said valve shaft when said cap is mounted on and closes said discharge port.

* * * * *